(12) United States Patent
Ishiyama et al.

(10) Patent No.: US 11,351,584 B2
(45) Date of Patent: Jun. 7, 2022

(54) CALIBRATION DETERMINATION DEVICE AND CALIBRATION DETERMINATION METHOD FOR CALIBRATING THE TENSION OF A BONDING MEMBER

(71) Applicant: TOYOTA JIDOSHA KABUSHIKI KAISHA, Toyota (JP)

(72) Inventors: Shou Ishiyama, Toyota (JP); Hiromu Takai, Nisshin (JP); Seiji Ishizu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 16/841,857

(22) Filed: Apr. 7, 2020

(65) Prior Publication Data

US 2020/0338610 A1 Oct. 29, 2020

(30) Foreign Application Priority Data

Apr. 25, 2019 (JP) .............................. JP2019-084051

(51) Int. Cl.
*G01L 5/04* (2006.01)
*B21B 37/52* (2006.01)
(Continued)

(52) U.S. Cl.
CPC .............. *B21B 37/52* (2013.01); *B21B 37/68* (2013.01); *G01L 1/005* (2013.01); *G01L 1/26* (2013.01);
(Continued)

(58) Field of Classification Search
CPC ......... B21B 38/06; B21B 37/54; B21B 37/68; B21B 37/52; B21C 47/003; G01L 5/0071; G01L 5/0085; G01L 5/0066
See application file for complete search history.

(56) References Cited

U.S. PATENT DOCUMENTS 3,808,857 A * 5/1974 Connors ................. B21B 37/16
72/8.6
3,808,858 A * 5/1974 Connors ................. B21B 37/16
72/10.4
(Continued)

FOREIGN PATENT DOCUMENTS

JP H10-246680 A 9/1998
JP H11-011758 A 1/1999
(Continued)

*Primary Examiner* — Tran M. Tran
(74) *Attorney, Agent, or Firm* — Oliff PLC

(57) ABSTRACT

A calibration determination device includes: a free roll that conveys the bonding member; a load detection device that detects a load applied to a bearing of the free roll; a tension adjustment device that winds the bonding member to increase a tension applied to the bonding member and unwinds the bonding member to reduce the tension applied to the bonding member so as to adjust the tension applied to the bonding member; and a calibration determination unit that determines whether calibration of the load detection device is necessary. The tension adjustment device unwinds the bonding member to cause the bonding member not to be subjected to the tension, and the calibration determination unit determines whether the calibration of the load detection device is necessary based on the load detected by the load detection device with the bonding member not being subjected to the tension.

7 Claims, 7 Drawing Sheets

(51) Int. Cl.
*B21B 37/68* (2006.01)
*G01L 1/00* (2006.01)
*G01L 1/26* (2006.01)
*G01L 5/00* (2006.01)
*G01L 25/00* (2006.01)
*G01N 3/62* (2006.01)

(52) U.S. Cl.
CPC ............ *G01L 5/0066* (2013.01); *G01L 25/00* (2013.01); *G01N 3/62* (2013.01); *B21B 2273/16* (2013.01); *B65H 2557/61* (2013.01)

(56) References Cited

U.S. PATENT DOCUMENTS

| | | | | |
|---|---|---|---|---|
| 3,869,891 A * | 3/1975 | Higham | .................. | B21B 37/46 72/9.2 |
| 4,145,901 A * | 3/1979 | Imai | ........................ | B21B 37/46 72/205 |
| 4,332,154 A * | 6/1982 | Nordvall | ................ | B21B 38/02 72/31.07 |
| 4,335,435 A * | 6/1982 | Miura | ..................... | B21B 37/26 72/11.4 |
| RE31,312 E * | 7/1983 | Eddens | .................. | G01L 5/107 73/862.633 |
| 4,548,063 A * | 10/1985 | Cox | ........................ | B21B 37/54 72/205 |
| 4,691,579 A * | 9/1987 | Ekola | ........................ | G01L 5/10 73/862.638 |
| 4,745,556 A * | 5/1988 | Turley | .................... | B21B 37/16 700/149 |
| 4,784,004 A * | 11/1988 | Ekola | ...................... | G01L 5/108 73/862.633 |
| 4,899,599 A * | 2/1990 | Eddens | ................. | G01L 1/2243 73/862.633 |
| 4,905,491 A * | 3/1990 | Starke | .................... | B21B 37/54 700/156 |
| 5,142,891 A * | 9/1992 | Kuwano | ................. | B21B 37/64 72/11.4 |
| 5,235,834 A * | 8/1993 | Bolkey | .................. | B21B 37/52 72/12.5 |
| 5,277,378 A * | 1/1994 | Ebisawa | ................ | G01L 5/107 318/7 |
| 5,470,005 A * | 11/1995 | King | ..................... | B21C 47/003 226/1 |
| 5,787,746 A * | 8/1998 | Ferreira | .................. | B21B 37/52 72/11.3 |
| 5,806,357 A * | 9/1998 | Bouchillon | ............. | B21B 37/52 72/10.2 |
| 6,148,653 A | 11/2000 | Sako et al. | | |
| 6,263,714 B1* | 7/2001 | Johnson | .................. | B21B 37/66 72/10.3 |
| 6,357,273 B1* | 3/2002 | Noe | ........................ | B21B 37/48 72/227 |
| 6,433,499 B1* | 8/2002 | Cote | .................... | B65H 23/044 101/463.1 |
| 6,810,706 B2* | 11/2004 | Clark | .................... | B21C 47/003 242/534 |
| 7,118,062 B2* | 10/2006 | Vaidyanathan | ........ | B65H 27/00 242/412.2 |
| 7,513,136 B2* | 4/2009 | Laliberte | ................... | B21B 3/00 72/241.8 |
| 8,713,979 B2* | 5/2014 | Schmid | ................... | B21C 47/02 72/10.2 |
| 9,085,022 B2* | 7/2015 | Horii | ...................... | B21C 51/00 |
| 9,352,367 B2* | 5/2016 | Kaga | ......................... | B21B 1/28 |
| 9,440,270 B2* | 9/2016 | Thiel | ....................... | B21B 38/08 |
| 9,555,614 B2* | 1/2017 | Lemelin | .................. | B41F 33/02 |
| 9,728,793 B2* | 8/2017 | Takai | ................... | B32B 38/1841 |
| 10,053,322 B2* | 8/2018 | Sato | .................... | B65H 23/048 |
| 10,166,584 B2* | 1/2019 | Brown | ................... | B21B 39/082 |
| 10,308,487 B2* | 6/2019 | Ost | ......................... | G01L 5/0061 |
| 10,413,949 B2* | 9/2019 | Mueller | .................... | B21B 1/22 |
| 10,576,521 B2* | 3/2020 | Tokunaga | ................ | B21B 37/68 |
| 10,946,425 B2* | 3/2021 | Scharfenorth | .......... | B21B 37/26 |
| 11,007,560 B2* | 5/2021 | Matsuo | .................... | B21C 47/003 |
| 2003/0121323 A1* | 7/2003 | Beuther | ................ | D21G 9/0036 73/159 |
| 2005/0034831 A1* | 2/2005 | Beuther | .................. | D21F 11/04 162/198 |
| 2016/0059283 A1* | 3/2016 | Breuer | .................... | B21B 35/06 72/241.4 |
| 2020/0290264 A1* | 9/2020 | Kamatani | ............... | B32B 27/26 |
| 2021/0060632 A1* | 3/2021 | Hashikawa | ............ | B65H 20/06 |

FOREIGN PATENT DOCUMENTS

| | | |
|---|---|---|
| JP | H11-169935 A | 6/1999 |
| JP | 2013-022110 A | 2/2013 |
| JP | 2014-203802 A | 10/2014 |
| JP | 2017-226510 A | 12/2017 |

\* cited by examiner

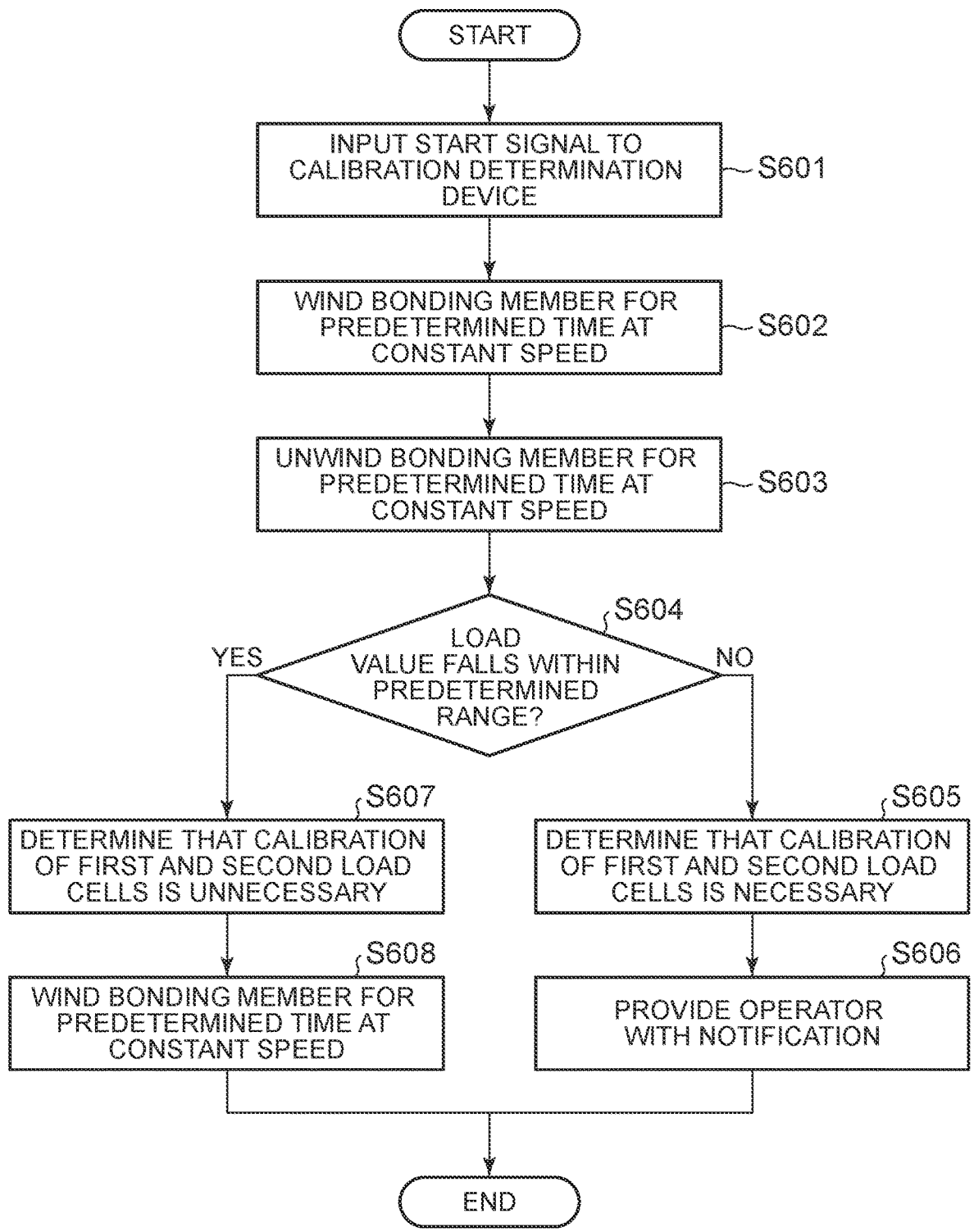

CALIBRATION DETERMINATION DEVICE AND CALIBRATION DETERMINATION METHOD FOR CALIBRATING THE TENSION OF A BONDING MEMBER

INCORPORATION BY REFERENCE

The disclosure of Japanese Patent Application No. 2019-084051 filed on Apr. 25, 2019 including the specification, drawings and abstract is incorporated herein by reference in its entirety.

BACKGROUND

1. Technical Field

The disclosure relates to a calibration determination device and a calibration determination method for determining whether calibration of tension detecting means is necessary.

2. Description of Related Art

There is a known bonding apparatus including free rolls that are provided on a bonding member conveyance path for conveying a bonding member and tension detecting means that detects a tension applied to the bonding member (for example, see Japanese Unexamined Patent Application Publication No. 2014-203802 (JP 2014-203802 A)).

SUMMARY

Calibration of the tension detecting means is performed in order to maintain its accuracy. When the calibration of the tension detecting means is performed, the bonding apparatus is stopped and the bonding member is removed from the bonding apparatus. In this case, an operator does not know whether the calibration of the tension detecting means is necessary until the bonding member is removed from the bonding apparatus. Thus, there is a possibility that the calibration of the tension detecting means is not performed although being necessary or the calibration is performed although being unnecessary.

The disclosure provides a calibration determination device and a calibration determination method that allow calibration of tension detecting means to be performed at an appropriate timing.

A first aspect of the disclosure relates to a calibration determination device. The calibration determination device includes: a free roll provided in a conveyance path for a bonding member and configured to convey the bonding member; a load detection device configured to detect a load applied to a bearing of the free roll; a tension adjustment device configured to wind the bonding member to increase a tension applied to the bonding member and unwind the bonding member to reduce the tension applied to the bonding member so as to adjust the tension applied to the bonding member; and a calibration determination unit configured to determine whether calibration of the load detection device is necessary. The tension adjustment device is configured to unwind the bonding member to cause the bonding member not to be subjected to the tension. The calibration determination unit is configured to determine whether the calibration of the load detection device is necessary based on the load that is detected by the load detection device with the bonding member not being subjected to the tension.

In the above aspect, the tension adjustment device may be configured to unwind the bonding member for a predetermined time at a constant speed to cause the bonding member not to be subjected to the tension.

In the above aspect, a negative value may be set as a set value of the tension in the tension adjustment device. The tension adjustment device may be configured to unwind the bonding member for a predetermined time at a constant speed in accordance with the set negative value of the tension.

In the above aspect, the tension adjustment device may be configured to wind the bonding member so as to increase the tension to a predetermined value and then to unwind the bonding member for a predetermined time at a constant speed.

The calibration determination device according to the first aspect further may include a notification device configured to provide a notification that the calibration of the load detection device is necessary when the calibration determination unit determines that the calibration of the load detection device is necessary.

In the above aspect, the tension adjustment device may include a roll. The roll may be provided with a meandering correction device. The meandering correction device may be configured to reciprocate the roll by a predetermined amount in an axial direction of the roll.

A second aspect of the disclosure relates to a calibration determination method for a calibration determination device. The calibration determination device includes a free roll provided in a conveyance path for a bonding member and configured to convey the bonding member, a load detection device configured to detect a load applied to a bearing of the free roll, a tension adjustment device configured to wind the bonding member to increase a tension applied to the bonding member and unwind the bonding member to reduce the tension applied to the bonding member so as to adjust the tension applied to the bonding member, and a calibration determination unit configured to determine whether calibration of the load detection device is necessary. The calibration determination method includes: unwinding the bonding member with the tension adjustment device to cause the bonding member not to be subjected to the tension; and determining, with the calibration determination unit, whether the calibration of the load detection device is necessary based on the load detected by the load detection device with the bonding member not being subjected to the tension.

According to the disclosure, it is possible to provide a calibration determination device and a calibration determination method that allow calibration of tension detecting means to be performed at an appropriate timing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart illustrating a flow of a calibration determination method according to the embodiment of the disclosure;

DETAILED DESCRIPTION OF EMBODIMENTS

Figure 1:
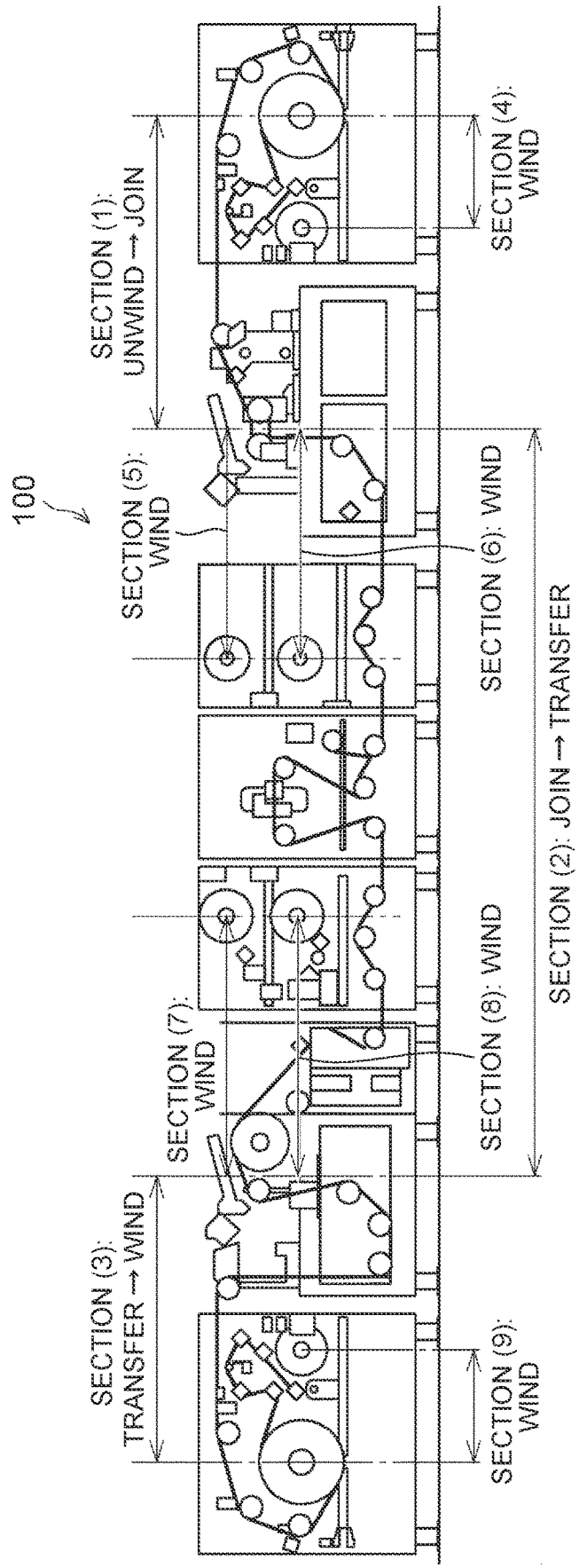
FIG. 1 is a diagram showing a schematic configuration of a bonding apparatus according to an embodiment of the disclosure.

Hereinafter, an embodiment of the disclosure will be described with reference to the drawings. For example, as shown in FIG. 1, an electrode part of a fuel cell is produced by sequentially performing, on a bonding member (a base material of a diffusion layer, etc.), bonding, transfer, cutting into sheets, and the like using a bonding apparatus 100. A conveying path for the bonding member is provided with a plurality of free rolls for conveying the bonding member. In each of sections (1) to (9) of the conveying path, tension is applied to the bonding member via each free roll.

Figure 2:
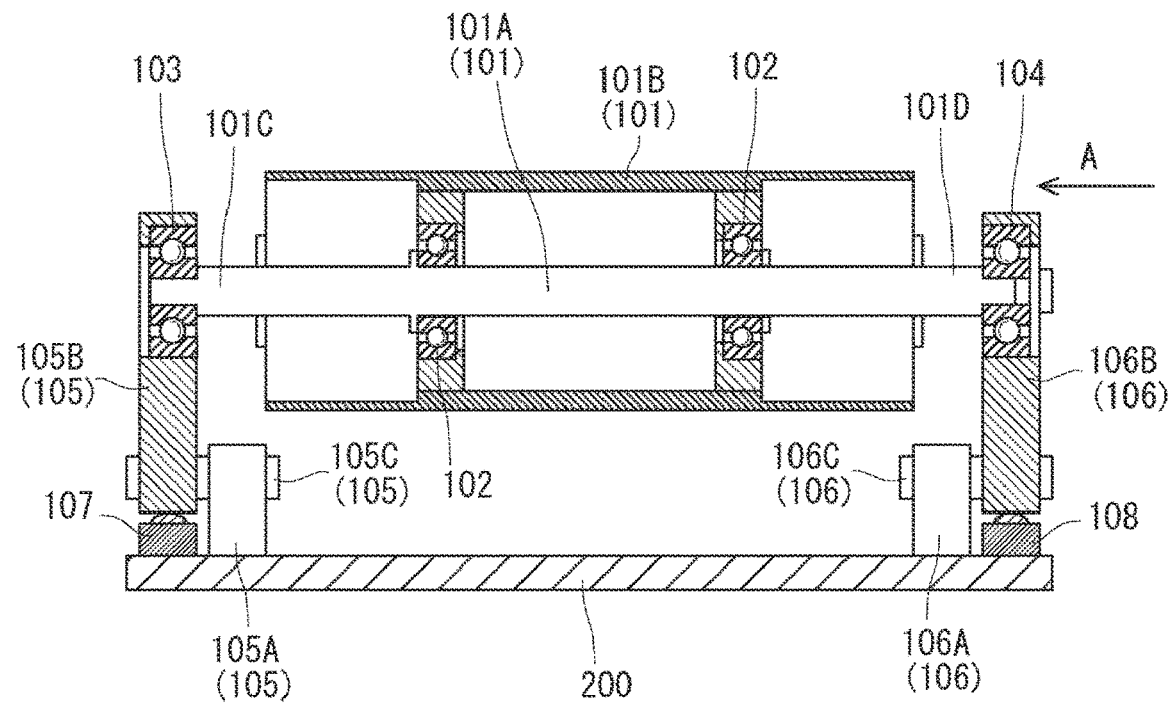
FIG. 2 is a sectional view showing a configuration of a free roll.
Figure 3:
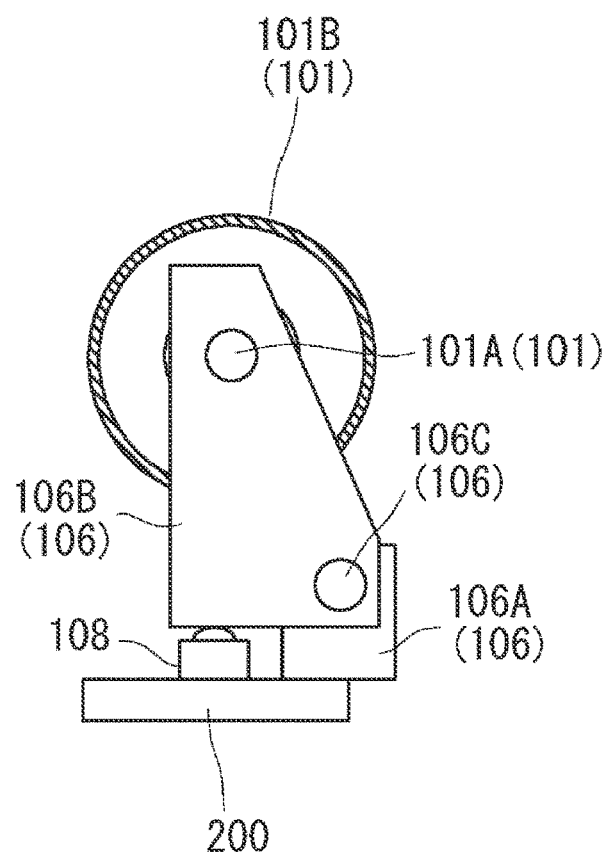
FIG. 3 is a side view of the free roll in FIG. 2, as seen in a direction A.

FIG. 2 is a sectional view showing a configuration of the free roll. FIG. 3 is a side view of the free roll in FIG. 2, as seen in a direction A. A free roll 101 rotates as the bonding member moves. The free roll 101 has a shaft 101A and a body 101B having a substantially cylindrical shape centered on the shaft 101A. The shaft 101A is rotatably supported by rotation bearings 102.

The rotation bearings 102 support the shaft 101A of the free roll 101 so that the shaft 101A is rotatable. In an example shown in FIG. 2, the shaft 101A of the free roll 101 is rotatably supported by the pair of rotation bearings 102 at predetermined positions of the shaft 101A, which are each located between an end of the shaft 101A and a center of the shaft 101A. The rotation bearings 102 are, for example, rolling bearings.

The shaft 101A of the free roll 101 is rotatably supported by a first bearing 103 at a first end 101C of the shaft 101A. The shaft 101A of the free roll 101 is rotatably supported by a second bearing 104 at a second end 101D of the shaft 101A, which is on the opposite side of the shaft 101A from the first end 101C. The first bearing 103 and the second bearing 104 are, for example, rolling bearings.

A first connecting portion 105 has a hinge structure, and connects the first bearing 103 to a base 200 so that the first bearing 103 is swingable. Specifically, the first connecting portion 105 includes a fixing portion 105A fixed on the base 200, a bearing fixing portion 105B for fixing the first bearing 103, and a connecting pin 105C that connects the bearing fixing portion 105B to the fixing portion 105A so that the bearing fixing portion 105B is swingable. When an axis deviation of the shaft 101A of the free roll 101 occurs with the rotation of the free roll 101, the bearing fixing portion 105B swings with respect to the fixing portion 105A. Thereby, a sliding resistance between the free roll 101 and the bonding member wound around the free roll 101 can be reduced.

A second connecting portion 106 has a hinge structure, and connects the second bearing 104 to the base 200 so that the second bearing 104 is swingable. Specifically, the second connecting portion 106 includes a fixing portion 106A fixed on the base 200, a bearing fixing portion 106B for fixing the second bearing 104, and a connecting pin 106C that connects the bearing fixing portion 106B to the fixing portion 106A so that the bearing fixing portion 106B is swingable. When an axis deviation of the shaft 101A of the free roll 101 occurs with the rotation of the free roll 101, the bearing fixing portion 106B swings with respect to the fixing portion 106A. Thereby, a sliding resistance between the free roll 101 and the bonding member wound around the free roll 101 can be reduced.

A first load cell 107 is a specific example of a load detection device. The first load cell 107 is disposed on the base 200 at a position where the first load cell 107 can contact a lower surface of the bearing fixing portion 105B of the first connecting portion 105. The first load cell 107 is disposed at a position where a first load can be detected. The first load is applied to the bearing fixing portion 105B of the first connecting portion 105 due to bending of the bonding member wound around the free roll 101. Specifically, when a direction in which the shaft 101A of the free roll 101 extends is defined as a width direction, the first load cell 107 is disposed at a position away from the connecting pin 105C of the first connecting portion 105 by a predetermined distance in a direction away from the viewer of FIG. 2. Thereby, the first load cell 107 detects the first load applied to the bearing fixing portion 105B of the first connecting portion 105.

A second load cell 108 is a specific example of the load detection device. The second load cell 108 is disposed on the base 200 at a position where the second load cell 108 can contact a lower surface of the bearing fixing portion 106B of the second connecting portion 106. The second load cell 108 is disposed at a position where a second load can be detected. The second load is applied to the bearing fixing portion 106B of the second connecting portion 106 due to bending of the bonding member wound around the free roll 101. Specifically, when the direction in which the shaft 101A of the free roll 101 extends is defined as the width direction, the second load cell 108 is disposed at a position away from the connecting pin 106C of the second connecting portion 106 by a predetermined distance in the direction away from the viewer of FIG. 2. Thereby, the second load cell 108 detects the second load applied to the bearing fixing portion 106B of the second connecting portion 106.

The first and second loads and the tension applied to the bonding member are in a substantially proportional relationship. As the first and second loads increase, the tension applied to the bonding member also increases. That is, the first and second loads are detected so that the tension applied to the bonding member can be detected. The first and second load cells 107 and 108 function as tension detecting means that detects the tension applied to the bonding member.

Calibration of the load cells is performed in order to maintain their accuracy. When the calibration of the load cells is performed, the bonding apparatus 100 is stopped and the bonding member is removed from the bonding apparatus 100. In this case, an operator does not know whether the calibration of the load cells is necessary until the bonding member is removed from the bonding apparatus 100. Thus, there is a possibility that the calibration of the tension detecting means is not performed although being necessary or the calibration is performed although being unnecessary In contrast, the calibration determination device according to the embodiment unwinds the bonding member so that the bonding member is not subjected to the tension. With the bonding member not being subjected to the tension, the calibration determination device 1 determines whether the calibration of the first and second load cells 107, 108 is necessary, based on the loads detected by the first and second load cells 107, 108. Thus, it is possible to determine whether the calibration of the first and second load cells 107, 108 is necessary, so that the calibration of the load cells can be performed at an appropriate timing.

Figure 4:
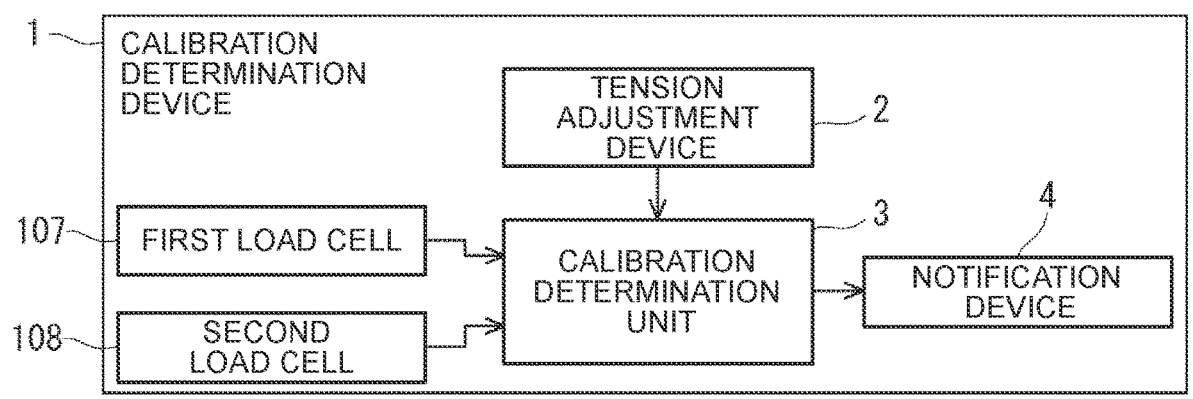
FIG. 4 is a block diagram showing a schematic system configuration of a calibration determination device according to the embodiment of the disclosure.

FIG. 4 is a block diagram showing a schematic system configuration of the calibration determination device according to the embodiment of the disclosure. A calibration determination device 1 according to the embodiment includes the first and second load cells 107, 108, a tension adjustment unit 2 that adjusts the tension applied to the bonding member, a calibration determination unit 3 that determines whether the calibration of the first and second load cells 107, 108 is necessary, and a notification unit 4 that provides a notification to a user.

The calibration determination device 1 is configured as hardware mainly including a microcomputer. The microcomputer includes: for example, a central processing unit (CPU) that performs control processing and arithmetic processing; a memory including a read-only memory (ROM) and a random access memory (RAM) that store a control program, an arithmetic program, etc. executed by the CPU; and an interface unit (I/F) that allows input and output of signals to and from an outside. The CPU, the memory, and the interface unit are connected with one another via a data bus or the like.

The tension adjustment unit 2 is a specific example of a tension adjustment device. The tension adjustment unit 2 winds the bonding member so as to increase the tension applied to the bonding member, and unwinds the bonding member so as to reduce the tension applied to the bonding member. In this way, the tension adjustment unit 2 adjusts the tension applied to the bonding member. The tension adjustment unit 2 includes, for example, a roll that winds and unwinds the bonding member, and an actuator such as a motor that rotates the roll.

Figure 5A:
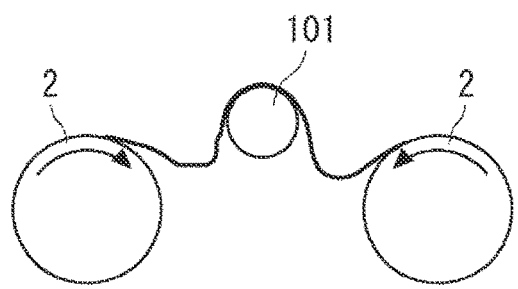
FIG. 5A is a diagram showing a tension adjustment unit unwinding a bonding member.

As shown in FIG. 5A, the tension adjustment unit 2 unwinds the bonding member for a predetermined time at a constant speed. Thereby, the bonding member can be set to a loose state where the bonding member is not subjected to tension. The predetermined time and the constant speed are experimentally determined as optimal values at which the bonding member becomes loose, and are set in the tension adjustment unit 2.

Figure 5B:
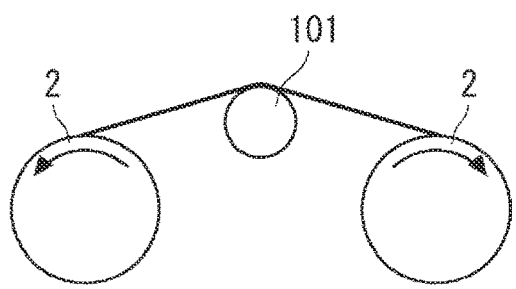
FIG. 5B is a diagram showing the tension adjustment unit winding the bonding member.

As shown in FIG. 5B, the tension adjustment unit 2 winds the bonding member for a predetermined time at a constant speed. Thus, the bonding member can be subjected to a tension of a predetermined value is applied. The predetermined time and the constant speed are experimentally determined as optimal values at which the bonding member is subjected to the tension of the predetermined value, and are set in the tension adjustment unit 2.

The calibration determination unit 3 is a specific example of a calibration determination unit. The calibration determination unit 3 includes a CPU. The first and second load cells 107, 108 are connected to the calibration determination unit 3. The calibration determination unit 3 determines whether the calibration of the first and second load cells 107, 108 is necessary, based on the first and second loads output from the first and second load cells 107, 108.

For example, the calibration determination unit 3 calculates a value of a load applied to the bearings of the free roll 101 by summing the first and second loads. The calibration determination unit 3 may calculate the value of the load applied to the bearings of the free roll 101 by calculating an average value of the first and second loads.

The calibration determination unit 3 determines whether the calculated value of the load falls within a predetermined range set in advance. The range in which the value of the load can be determined to be normal (for example, about ±10%) is experimentally determined in advance, and is set in the calibration determination unit 3 as the predetermined range.

When determining that the calculated value of the load does not fall within the predetermined range set in advance, the calibration determination unit 3 determines that the calibration of the first and second load cells 107, 108 is necessary. On the other hand, when determining that the calculated value of the load falls within the predetermined range set in advance, the calibration determination unit 3 determines that the calibration of the first and second load cells 107, 108 is unnecessary.

When determining that the calibration of the first and second load cells 107, 108 is necessary, the calibration determination unit 3 outputs a calibration instruction signal to the notification unit 4 as a result of the determination.

The notification unit 4 is a specific example of a notification device. The notification unit 4 provides the operator or the like with a notification that the calibration of the first and second load cells 107, 108 is necessary, in response to the calibration instruction signal from the calibration determination unit 3. The notification unit 4 is configured as, for example, a speaker that outputs a warning sound, a display that displays a warning, and a warning light that lights up or flashes.

Figure 7:
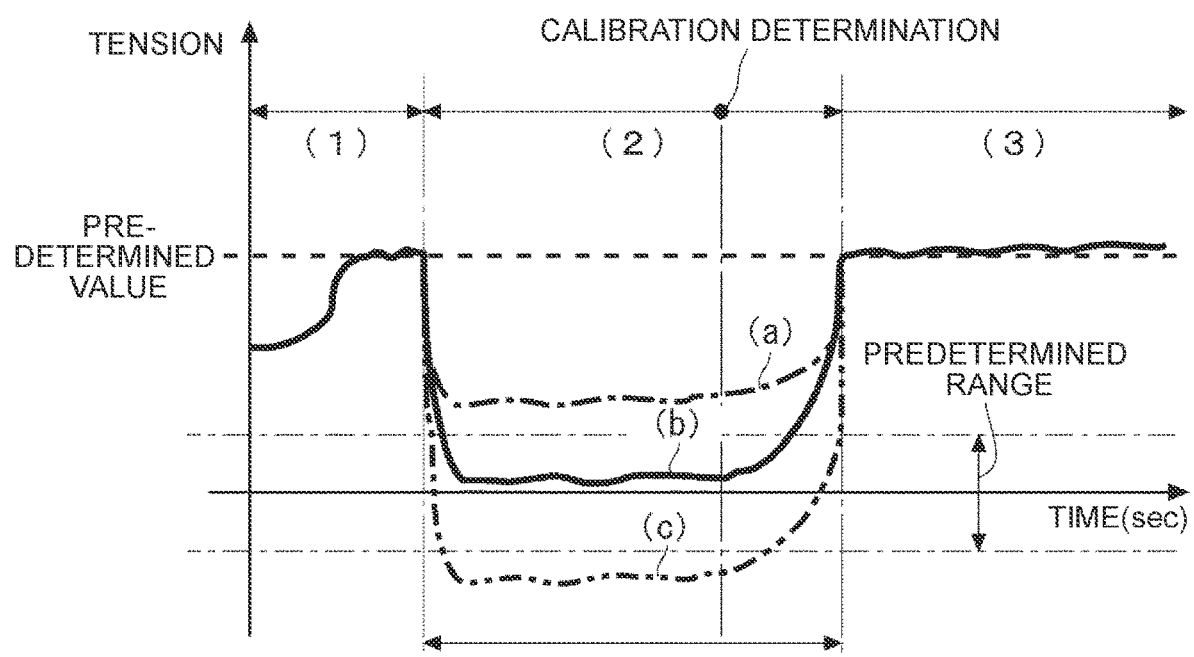
FIG. 7 is a diagram showing an example of changes in tension applied to the bonding member.

FIG. 6 is a flowchart illustrating a flow of a calibration determination method according to the embodiment of the disclosure. FIG. 7 is a diagram showing an example of changes in the tension applied to the bonding member. For example, a start signal serving as a trigger for starting calibration determination is input to the calibration determination device 1 (step S601). When the operator presses a switch for starting the calibration determination, for example, the switch outputs the start signal to the calibration determination device 1.

The tension adjustment unit 2 winds the bonding member for the predetermined time at the constant speed (step S602). Thereby, the bonding member is subjected to the tension of the predetermined value, as shown by (1) in FIG. 7. The tension of the predetermined value is first applied to the bonding member because the initial state of the first bonding member is unclear. When the initial state of the bonding member is clear, this step may be omitted.

Thereafter, the tension adjustment unit 2 unwinds the bonding member for the predetermined time at the constant speed (step S603). Thereby, the bonding member is not subjected to the tension of the predetermined value is not applied, as shown by (2) in FIG. 7. With such control, the amount of loosening of the bonding member becomes constant, so that the time for which the tension is again applied to the bonding member can be made constant.

At this time, a negative value is set as a set value of the tension in the tension adjustment unit 2. The tension adjustment unit 2 unwinds the bonding member for the predetermined time at the constant speed in accordance with the negative set value. Although the set value of the tension is negative, the tension does not actually takes a negative value. Therefore, the bonding member can be unwound for the predetermined time.

The calibration determination unit 3 calculates the value of the load applied to the bearings of the free roll 101 based on the first and second loads from the first and second load cells 107, 108. The calibration determination unit 3 determines whether the calculated value of the load falls within the predetermined range set in advance (step S604).

When determining that the calculated value of the load does not fall within the predetermined range ((a) and (c) in FIG. 7) (NO in step S604), the calibration determination unit 3 determines that the calibration of the first and second load cells 107, 108 is necessary (step S605).

The notification unit 4 provides the operator or the like with the notification that the calibration of the first and second load cells 107, 108 is necessary, based on the determination result that the calibration is necessary, which is made by the calibration determination unit 3 (step S606). Then, the process ends.

On the other hand, when determining that the calculated value of the load falls within the predetermined range ((b) in FIG. 7) (YES in step S604), the calibration determination unit 3 determines that the calibration of the first and second load cells 107, 108 is unnecessary (step S607). The tension adjustment unit 2 winds the bonding member for the predetermined time at the constant speed (step S608). Thereby, the bonding member is subjected to the tension of the predetermined value, as shown by (3) in FIG. 7.

The calibration determination device 1 according to the embodiment unwinds the bonding member so that the bonding member is not subjected to the tension. With the bonding member not being subjected to the tension, the calibration determination device 1 determines whether the calibration of the first and second load cells 107, 108 is necessary, based on the loads detected by the first and second load cells 107, 108. Thus, it is possible to determine whether the calibration of the first and second load cells 107, 108 is necessary, so that the calibration of the load cells can be performed at an appropriate timing.

Although some embodiments of the disclosure have been described, these embodiments are provided by way of example only and are not intended to limit the scope of the disclosure. These novel embodiments can be implemented in various other forms, and various omissions, replacements, and changes can be made without departing from the scope of the disclosure. The embodiments and their modifications are included in the scope of the disclosure, and are also included in the scope of the disclosure described in the claims and equivalents thereof.

Figure 8:
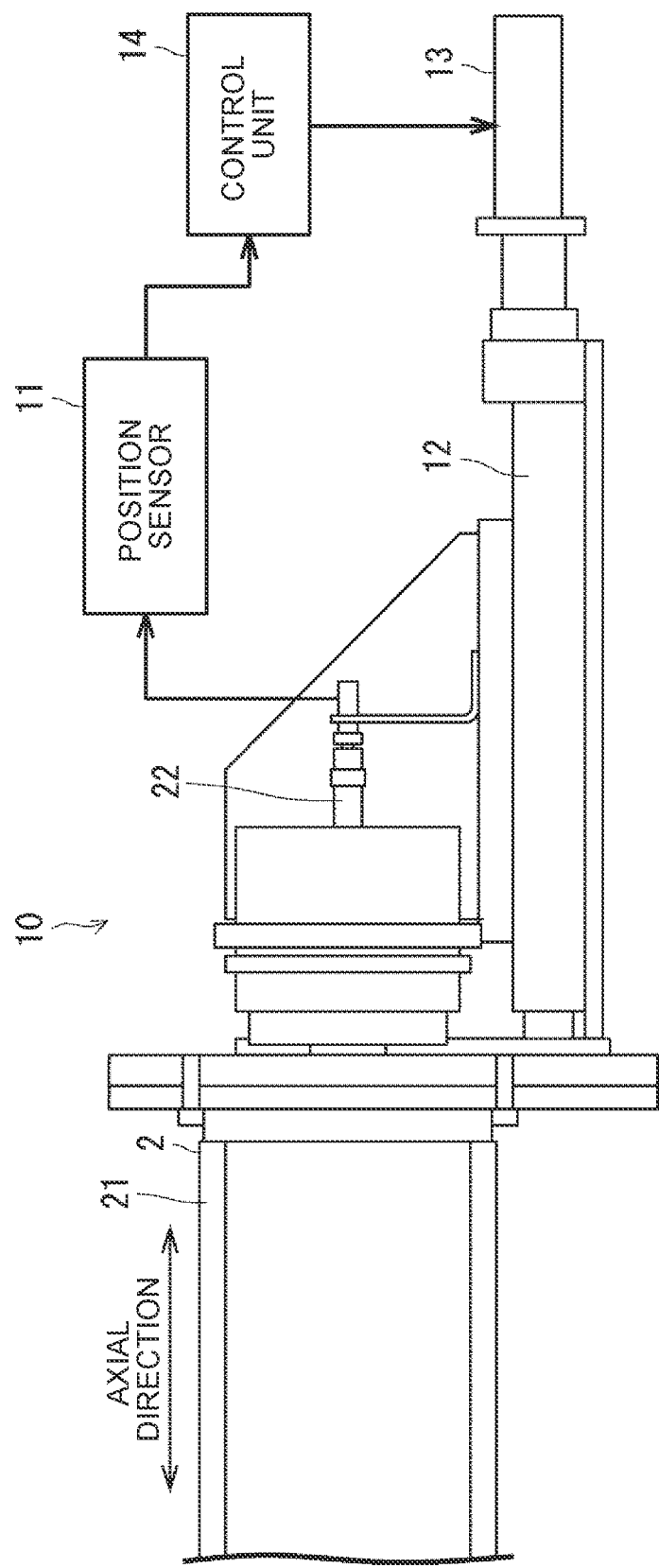
FIG. 8 is a diagram showing a schematic configuration of a meandering correction device.

In the above embodiments, the roll 21 of the tension adjustment unit 2 for winding and unwinding the bonding member may be provided with a meandering correction device 10, as shown in FIG. 8. The meandering correction device 10 corrects meandering of the roll 21 by moving the roll 21 of the tension adjustment unit 2 in the axial direction. FIG. 8 is a diagram showing a schematic configuration of the meandering correction device.

The meandering correction device 10 includes, for example, a position sensor 11 that detects a position of a shaft end 22 of the roll 21, a moving mechanism 12 that moves the roll 21 in the axial direction, a motor 13 that drives the moving mechanism 12, and a control unit 14 that controls the motor 13. The moving mechanism 12 is composed of a guide, a ball screw, and the like.

When the control unit 14 determines that the position of the shaft end 22 of the roll 21, which is detected by the position sensor 11, is deviated from a target position, the control unit 14 controls the moving mechanism 12 via the motor 13 so as to move the roll 21 in the axial direction.

Thereby, the position of the shaft end 22 of the roll 21 can be adjusted to the target position, and the axial deviation of the roll 21 can be corrected.

The roll around which the bonding member is wound usually extends straight. Thus, even when the roll is changed, the roll is not deviated much in the axial direction. Therefore, the moving mechanism of the meandering correction mechanism only reciprocates the roll by small amounts, and the grease circulation of the sliding components (the guide, the ball screw, etc. of the moving mechanism) may become insufficient.

In contrast, for example, after the calibration determination unit 3 determines whether the calculated value of the load falls within the predetermined range, the control unit 14 of the meandering correction device 10 may control the moving mechanism 12 via the motor 13 so as to reciprocate the roll 21 by a predetermined amount in the axial direction. Thereby, it is possible to largely reciprocate the roll 21 in the axial direction and cause the grease to sufficiently circulate in the sliding components of the moving mechanism 12.

Figure 9:
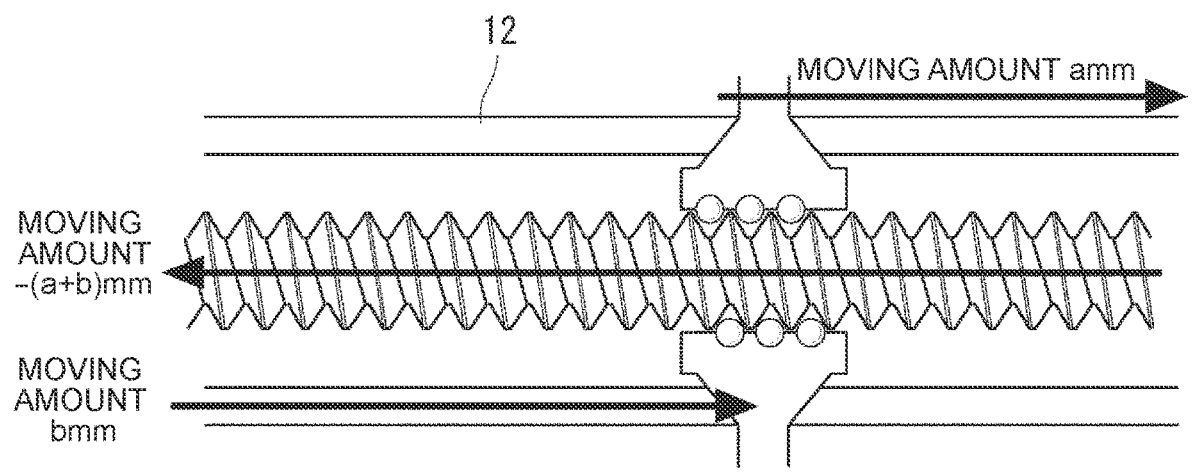
FIG. 9 is a diagram showing a roll that has been reciprocated by a predetermined amount in an axial direction.

For example, as shown in FIG. 9, the control unit 14 of the meandering correction device 10 may control the moving mechanism 12 via the motor 13 so as to reciprocate the roll 21 by the predetermined amount (a+b) mm in the axial direction.

Note that the control unit 14 of the meandering correction device 10 may control the moving mechanism 12 via the motor 13 so as to reciprocate the roll 21 by the predetermined amount in the axial direction at a desired timing.

In the disclosure, it is possible to perform the process illustrated in FIG. 6 by causing the CPU to execute a computer program, for example.

The program can be stored in various types of non-transitory computer readable media and supplied to a computer. The non-transitory computer readable media include various types of tangible storage media. Examples of the non-transitory computer readable media include magnetic storage media (e.g., a flexible disk, a magnetic tape, a hard disk drive), magneto-optical storage media (e.g., magneto-optical disk), a compact-disk read-only memory (CD-ROM), a compact-disk recordable (CD-R), a compact-disk rewritable (CD-R/W), a semiconductor memory (e.g., a mask ROM, a programmable ROM (PROM), an erasable PROM (EPROM), a flash ROM, and a random access memory (RAM).

The program may be supplied to the computer by various types of transitory computer readable media. Examples of the transitory computer readable media include electric signals, optical signals, and electromagnetic waves. The transitory computer-readable medium can supply the program to the computer via a wired communication path such as an electric wire and optical fiber, or a wireless communication path.

What is claimed is:

1. A calibration determination device comprising:
   a free roll provided in a conveyance path for a bonding member and configured to convey the bonding member;
   a load detection device configured to detect a load applied to a bearing of the free roll;
   a tension adjustment device including a tension roll configured to wind the bonding member around the tension roll to increase a tension applied to the bonding member and unwind the bonding member from the tension roll to reduce the tension applied to the bonding member so as to adjust the tension applied to the bonding member, the tension adjustment device being configured to unwind the bonding member to cause the bonding member not to be subjected to the tension; and a calibration determination processor programmed to determine whether calibration of the load detection device is necessary based on the load that is detected by the load detection device while the bonding member is not being subjected to the tension.

2. The calibration determination device according to claim 1, wherein the tension adjustment device is configured to unwind the bonding member for a predetermined time at a constant speed to cause the bonding member not to be subjected to the tension.

3. The calibration determination device according to claim 2, wherein:

a negative value is set as a set value of the tension in the tension adjustment device; and the tension adjustment device is configured to unwind the bonding member for the predetermined time at the constant speed based on the set negative value of the tension.

4. The calibration determination device according to claim 2, wherein the tension adjustment device is configured to wind the bonding member so as to increase the tension to a predetermined value, and then to unwind the bonding member for the predetermined time at the constant speed.

5. The calibration determination device according to claim 1, further comprising:

a notification device configured to provide a notification that the calibration of the load detection device is necessary when the calibration determination processor determines that the calibration of the load detection device is necessary.

6. The calibration determination device according to claim 1, wherein:

the tension roll is provided with a meandering correction device; and the meandering correction device is configured to reciprocate the tension roll by a predetermined amount in an axial direction of the tension roll.

7. A calibration determination method for a calibration determination device, the calibration determination device including a free roll provided in a conveyance path for a bonding member and configured to convey the bonding member, a load detection device configured to detect a load applied to a bearing of the free roll, a tension adjustment device including a tension roll configured to wind the bonding member around the roll to increase a tension applied to the bonding member and unwind the bonding member from the roll to reduce the tension applied to the bonding member so as to adjust the tension applied to the bonding member, and a calibration determination processor programmed to determine whether calibration of the load detection device is necessary, the calibration determination method comprising:

unwinding the bonding member with the tension adjustment device to cause the bonding member not to be subjected to the tension; and determining, with the calibration determination processor, whether the calibration of the load detection device is necessary based on the load detected by the load detection device while the bonding member is not being subjected to the tension.

\* \* \* \* \*